July 3, 1951

C. R. HAGEN ET AL 2,558,951

COTTON-PICKING APPARATUS RECEPTACLE AND MEANS
FOR DIRECTING COTTON THEREINTO

Original Filed June 29, 1944

INVENTORS:
Clarence R. Hagen
and David B. Baker.
By Paul O. Pippel, Atty.

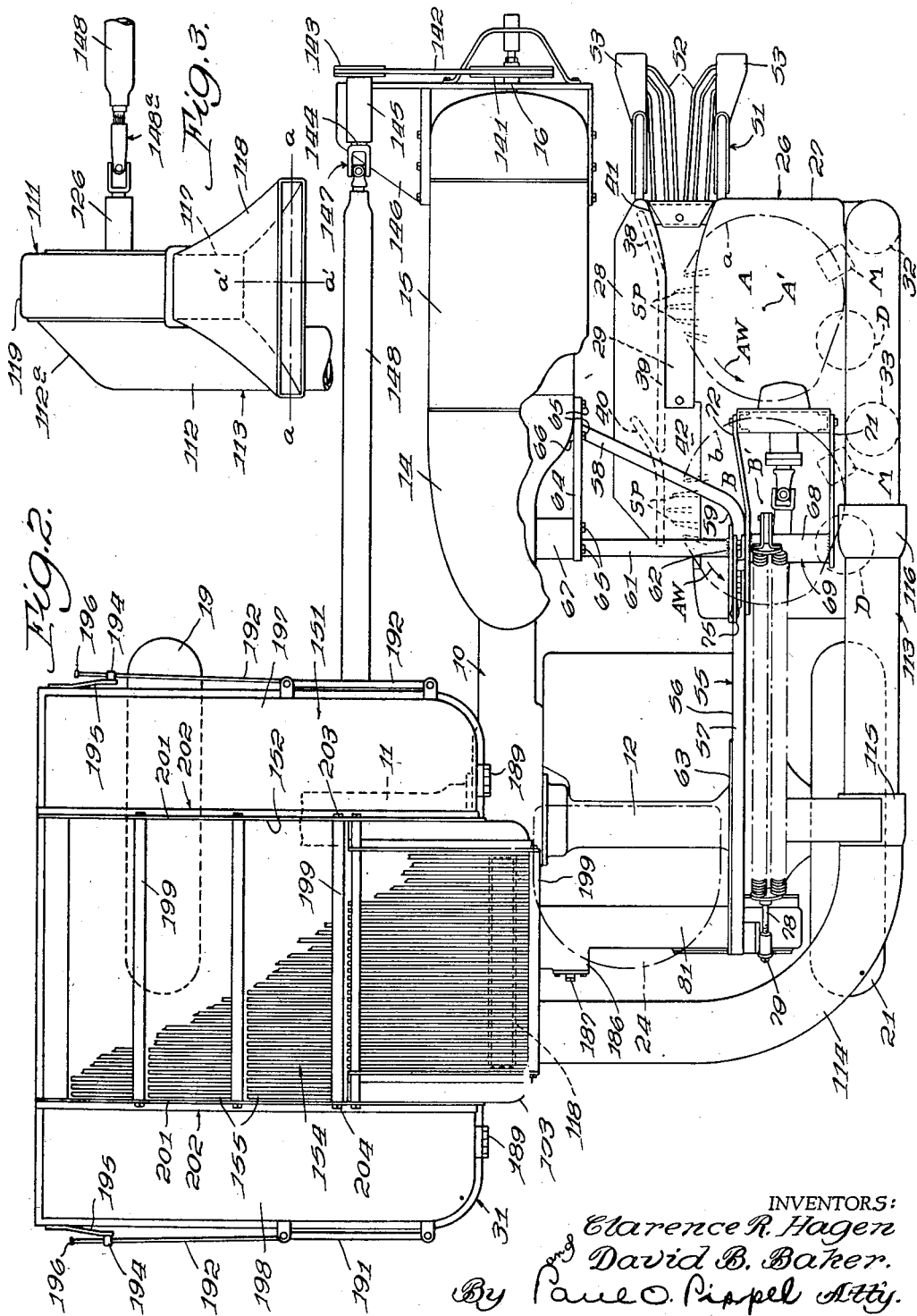

INVENTORS:
Clarence R. Hagen
and David B. Baker.
By Paul O. Pippel Atty.

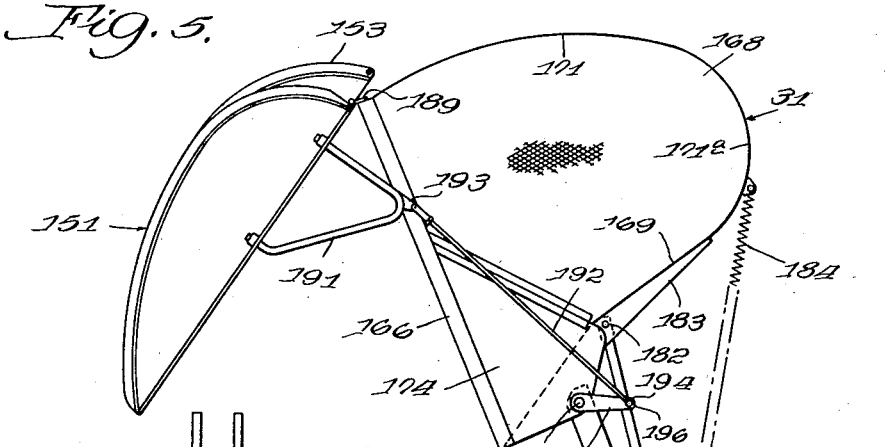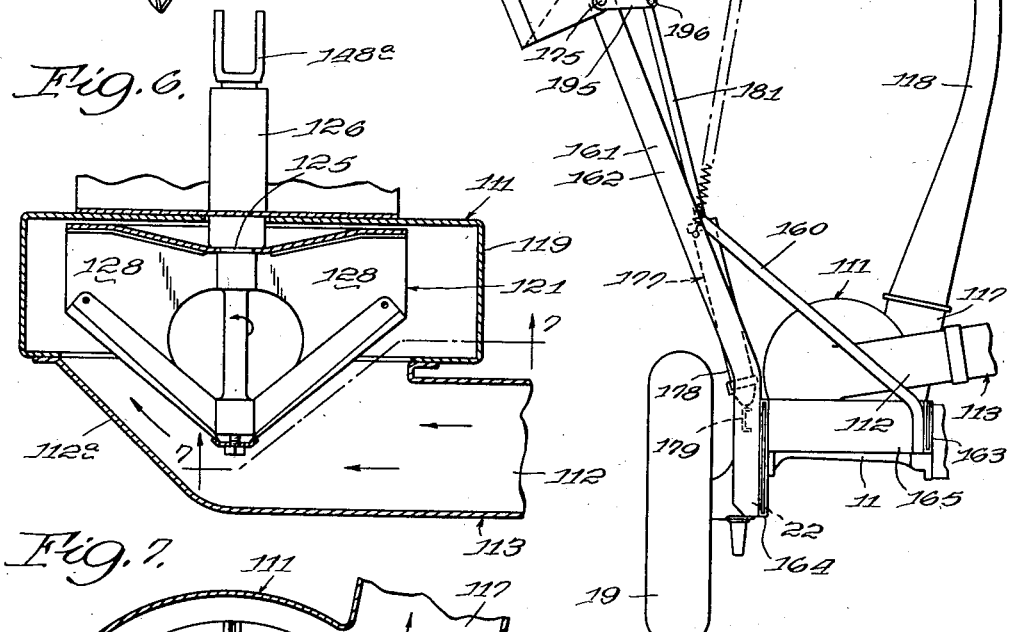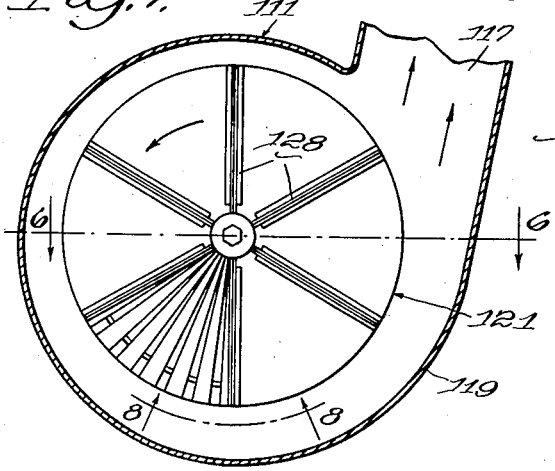

Patented July 3, 1951

2,558,951

UNITED STATES PATENT OFFICE 2,558,951

COTTON-PICKING APPARATUS RECEPTACLE AND MEANS FOR DIRECTING COTTON THEREINTO

Clarence R. Hagen, Memphis, Tenn., and David B. Baker, Riverside, Ill., assignors to International Harvester Company, a corporation of New Jersey Substituted for application Serial No. 542,774, June 29, 1944. This application February 12, 1948, Serial No. 7,834

6 Claims. (Cl. 214—83.28)

1

This invention has to do with a pneumatic cotton handling system adapted for use in cotton picking machinery and more particularly concerns a receptacle for the picked cotton and cotton conveying and cleaning means associated therewith, this application being a substitute for our prior application Serial No. 542,774, filed June 29, 1944, now abandoned.

An object of this invention is the provision of a novel cotton receptacle cover structure having an arched grille-work against the under side of which a stream of cotton-laden air is impingeable for separating the air and trash from the cotton while directing the cotton into a desired part of the receptacle. By this arrangement the air stream is ejected with undesired debris consisting principally of plant stems and leaves, and the course of the cleaned cotton is so controlled in the receptacle that it can be completely filled without special attention of the operator.

Another object is the provision of an arched grating or grille in the roof of the receptacle for deflecting the cotton across the top thereof from one wall to an opposite wall whereby the cotton commences to fill the receptacle along said opposite wall, and the surface of repose of the cotton approaches the cotton-admittance zone near the top of the one wall as the receptacle fills.

Another object is the provision of a receptacle cover which has an opening covered by the grille and which is impervious to the ejected debris to prevent the later sifting into the receptacle.

Another object is the provision of a debris-impervious vaulted cover for the receptacle so it will automatically discharge the debris alighting thereon.

Another object is the provision of a receptacle which is tiltable in dumping and which has a cover member with a grille-work of the aforesaid character extending from the edge of the receptacle opposite to the pouring edge and including slender laterally-spaced elements extending lengthwise of the grille-work whereby, upon dumping, the grille-work has no tendency to hold onto the cotton.

The above and other desirable objects inherent in and encompassed by the invention will be better understood upon reading the ensuing description with reference to the annexed drawings, wherein:

Figure 2 is a plan view of the tractor and apparatus shown in Figure 1;

Figure 3 is a plan view of a cotton conveying blower employed in the apparatus and installed below the cotton receptacle as illustrated in Figs. 1, 4 and 5;

Figure 5 is a fragmentary rear elevational view illustrating the receptacle in the dumping position;

Figure 6 is a horizontal sectional view taken through the blower as illustrated by the line 6 in Figure 7;

Figure 7 is a vertical sectional view taken through the blower at the plane indicated by the line 7—7 in Figure 6; and Figure 8 is a fragmentary view illustrating a peripheral edge of the blower rotor and a radially slotted guard therefor, taken on the line 8—8 of Figure 7.

Figure 1:
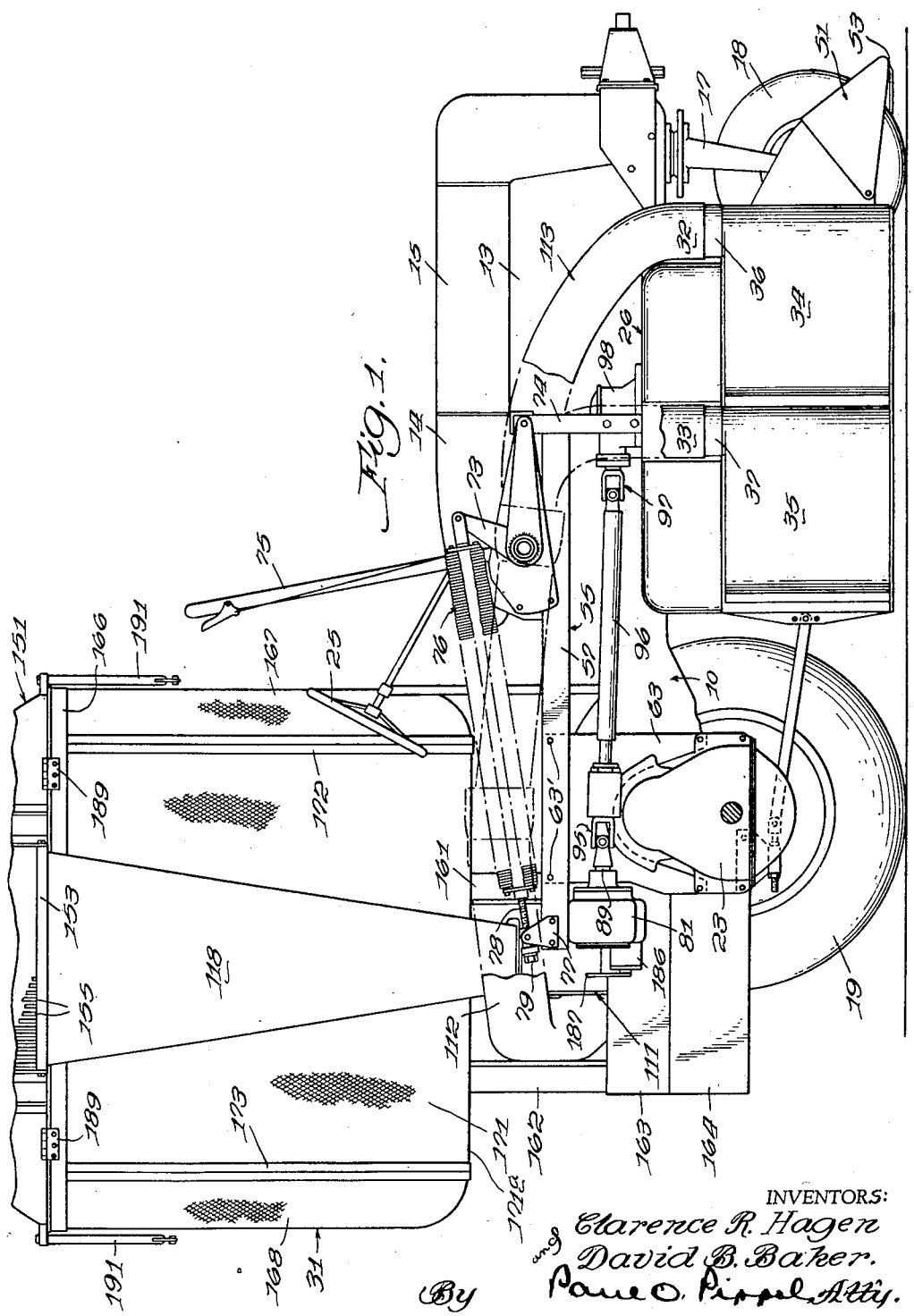
Figure 1 is a side elevational view of a tractor with the preferred embodiment of the invention installed thereon.

With the view of clearly and completely illustrating the invention, it has been shown in conjunction with a complete tractor-mounted cotton picking machine. It follows that many of the parts shown are not herein claimed so those interested in the claims directed to collateral parts of the machine should refer to copending applications Serial No. 542,770, filed June 29, 1944, now Pat. No. 2,518,465, granted August 15, 1950, to Clarence R. Hagen and Louis E. Nickla; Serial No. 542,771, filed June 29, 1944, now Pat. No. 2,520,927, granted September 5, 1950 to Clarence R. Hagen; Serial No. 542,772, filed June 29, 1944, now Pat. No. 2,440,770 granted May 4, 1948, to Clarence R. Hagen, and Serial No. 542,773, filed June 29, 1944, now Pat. No. 2,401,152, granted May 28, 1946, to Clarence R. Hagen.

The tractor upon which the apparatus is herein assembled is one variety of farm tractor comprising a body 10 projecting forwardly from oppositely extending rear axle housings 11 and 12. At the front portion of the body 10 is the conventionally placed internal combustion engine 13 superposed by a fuel tank 14 and a hood 15. A shaft 16 at the front of the tractor is an extension of the engine crank shaft. Support for the front end of the tractor is provided by the usual steering truck 17 comprising a ground-engaging steering wheel 18. Support for the rear end of the tractor is provided by rear traction wheels 19 and 21 at the outer ends of the axle housings 11 and 12. Depending gear containing portions 22 and 23 at the outer ends of the axle housings 11 and 12 contain gears (not shown) which transmit driving force from axles within the housings 11 and 12 to the hubs of the wheels 19 and 21, the housing portions 22 and 23 being upright so as to support the inner parts of the axle housings at an elevation to give ample clearance for the field plants.

An operator's station includes an operator's seat 24 suitably supported adjacently to and over the axle housing 12—that is, the one side of the tractor body 10. The tractor steering wheel 25 is directly in front of the seat 24.

A cotton-picking unit generally designated 26 is of the revolvable spindle type. This unit, which is placed at the right of the tractor body, includes a casing 27 separated from a pressure plate assembly 28 by a fore and aft extending plant receiving passage 29. Two groups, A and B, or assemblies of cotton-picking spindles are enclosed in the casing 27 in a tandem arrangement with the assembly A disposed forwardly of the assembly B. Cotton-picking assemblies A and B may be of the character fully described in United States Patent 2,140,631, so it will suffice for the present disclosure to merely explain that the picker spindles SP of the assemblies A and B are revolved generally about axes A' and B' to cause their tips to follow the path indicated by the dot-dash lines a and b. It will be seen, therefore, that the picker spindles, while they are being revolved about the axes A' and B', are successively projected into the plant receiving passage 29 and thereafter withdrawn from this passage. While in the passage and while rotating about their individual axes, these spindles engage and cause the cotton of ripened bolls to be wound thereabout so that upon retraction of the spindles into the casing 27, this cotton will be withdrawn from the bolls. There are several vertically spaced rows of the spindles SP so that the cotton plants disposed within the passage will be operated upon throughout the height of the passage.

The spindles SP revolve in the direction indicated by the arrows AW, and upon arriving in registry with a group of vertically spaced doffing disks shown in dotted outline at D, the cotton is removed from the spindles by these disks and is discharged into the casing 27. Subsequently, the spindles come in registry with vertically spaced moistening disks M where they are moistened prior to again being projected into the plant receiving passage. The casing 27, in addition to housing the picking spindle sets, the doffer disks and the moistening disks, also serves as an air chamber of a pneumatic system for the conduction of the picked cotton away from the picker finger assembles into a cotton receptacle 31. Air is drawn into the casing 27 through the openings at the plant passage where the picking fingers extend outwardly into said passage, and this air laden with the cotton doffed from the spindles, leads upwardly through conduit legs 32 and 33 for ultimate delivery into the receptacle 31. Doors 34 and 35 upon the outer side of the casing 27 pivot at their forward ends about axes which are coaxial with the lower ends of the conduit legs 32 and 33, and these doors have short conduit necks 36 and 37 pivotable within the conduit legs to facilitate opening and closing of the doors. Access is thereby easily had to the picker spindles, the doffing apparatus and the spindle moistening apparatus from the outer side of the picking unit 26.

That side of the plant receiving passage 29 opposite to the casing 27 is formed by plant pressing plates 38, 39 and 40 which are yieldably held into the positions illustrated so that they may be displaced toward the tractor engine when pressed upon by a profuse plant growth occupying the passage 29. The pressure plate assembly 28 is supported from the chamber 27 by a horizontal rod 41 at the upper forward end of the passage 29 and by a passage covering plate 42 at the rear end of the passage in registry with the rear picker spindle assembly B.

A plant lifting device 51 is attached to the forward end of the unit 26 for raising the lowermost stems of the plants off of the ground to a sufficient height for passing through the lower ones of the picking spindles SP. The device 51 comprises backwardly inclined rods 52 having ground-engaging runners 53 attached to their front ends.

Support for the picking unit 26 is provided by a frame 55 comprising a generally L-shaped frame member 56 having a fore and aft extending leg 57 and a laterally turned leg 58 having a juncture 59. A strut member 61 is arranged generally parallel with the leg 58 and connects with the frame member 55 adjacently to the juncture 59 where the member 61 extends through an aperture (not shown) in the leg 57 of the frame member 56. A welded connection 62 is provided between the members 61 and 56. The rear part of the leg 57 is supported upon the tractor axle housing 12 by a plate 63 to which the member 57 is secured by any standard means 63' in Fig. 1. A footing plate 64 is welded or otherwise secured to the free ends of the members 58 and 61, and this plate 64 is adapted to be secured to the tractor body 10 by means of capscrews 65 which are screwed into bosses or pads 66 and 67 provided upon said body 10.

The outer end of the strut 61 extending through the frame leg 57 extends into and provides a bearing spindle for the hub 68 of a bell-crank 69, which has a pair of laterally spaced horizontal arms 71 and 72 and an upright arm 73. The forward ends of the arms 71 and 72 mutually support the upper end of a linkage 74 which is suitably attached to the picking unit. By pivoting the bell-crank 69, the outer end of the arms 71 and 72 can be raised or lowered for changing the elevation of the picking unit which is suspended therefrom through the link 74. Pivoting of the bell-crank 69 is effected manually through a lever 75 having its lower end attached to the hub of the bell-crank and operable over a quadrant 70, Fig. 2, for retaining a selected height of the picking unit. The upwardly projecting arm of the bell-crank is operated upon by the counterbalancing spring assembly 76, which is adjustably connected to a bracket 77 on the back end of the frame leg 57 by a threaded rod 78 and a nut 79.

The drive for the picking unit 26, fully disclosed in application Serial No. 542,770 includes chain means within a transverse casing 81 at the rear of the tractor. This chain means is driven by a power take-off shaft (not shown) extending rearwardly through the body 10 of the tractor and drives sprocket means (not shown) within the casing 81 and upon the back end of a shaft 89. Shaft 89 is drivingly connected with gearing within a casing 98 upon the picking unit 26 by a universal joint 95, a drive shaft 96, and a second universal joint 97.

In addition to the air chamber 27 of the picking unit 26 and the conduits 32 and 33 herein above described, the cotton conveying system includes a blower 111 supported upon the tractor beneath the cotton receptacle 31. This blower has a horizontal inlet 112 through which air and cotton are sucked from the picking unit 26 through the conduit legs 32 and 33, Fig. 1, thence through a conduit 113 with which these legs 32 and 33 are confluent, and thence through a curved conduit 114. Conduit 113 extends rearwardly and upwardly over the right rear wheel of the tractor as well as over the rear axle housing structure 12, and the conduit 114 then connecting with the conduit 113 at a flexible joint 115 extends transversely across the rear of the tractor to the horizontal fan inlet 112. The conduit 113 also has a flexible joint 116 which cooperates with the joint 115 in articulating the conduit system so that it facilitates vertical adjustment or movement of the picking unit.

Figure 4:
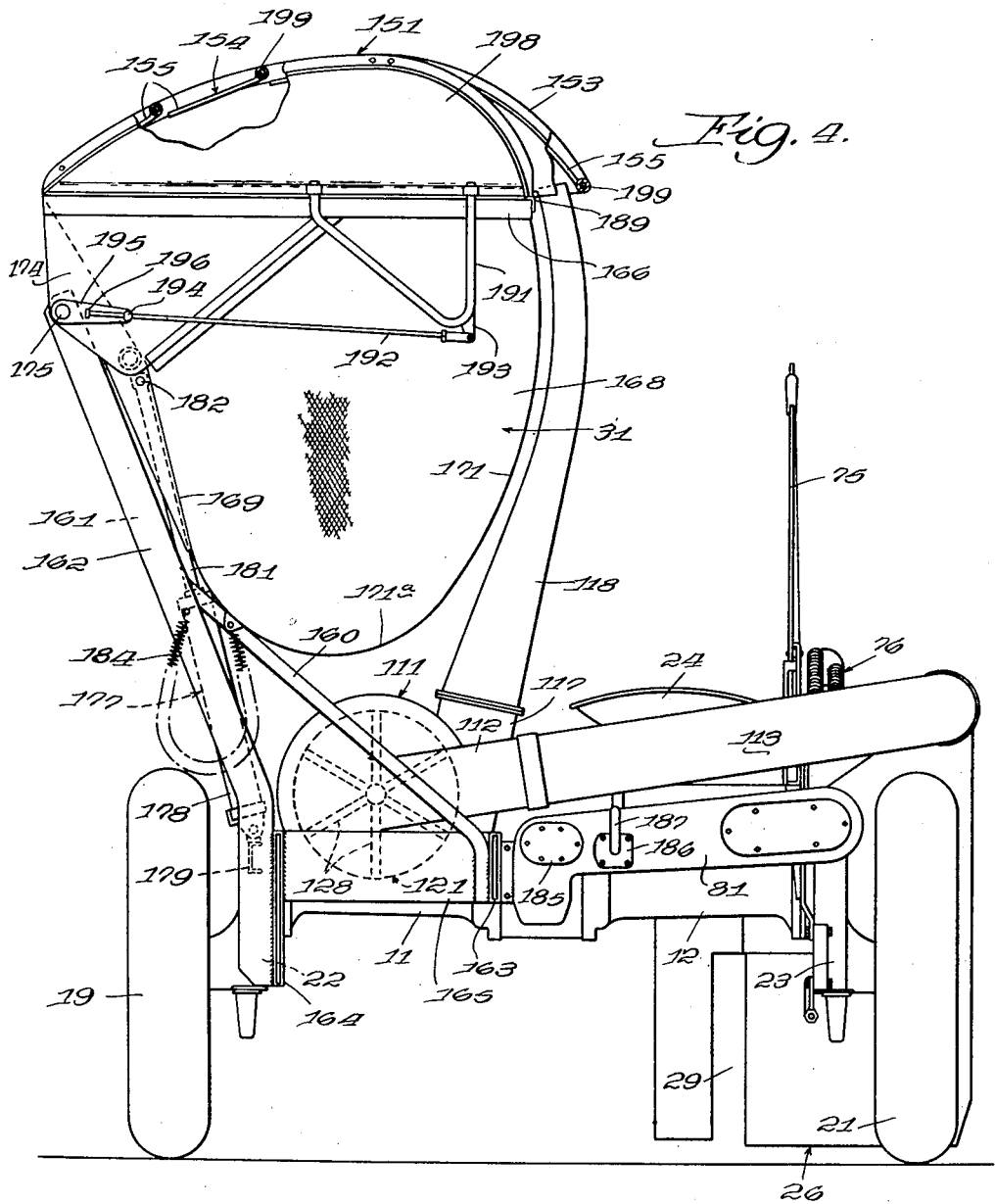
Figure 4 is a rear elevational view of the tractor and apparatus, with the receptacle in the filling position.

The fan outlet 117, Figs. 4 and 7, extends vertically for connection with an upwardly extending spout 118 through which the air and cotton are discharged into the upper part of the receptacle 31.

A bladed rotor 121 of the fan is mounted upon a shaft 125 journaled within a bearing 126 in the front wall of the rotor casing. Driving force for the fan rotor is obtained from a pulley 141, Fig. 2, fixed rotatively to the front end extension of the engine crank-shaft, a belt 142 drivingly connecting the pulley 141 with a pulley 143 upon the front end of a shaft 144 journaled within a bearing 145 supported upon a bracket 146 attached to the tractor engine. A universal joint 147 connects the back end of shaft 144 with a long shaft 148 of which the back end is connected directly with the blower rotor shaft 125 through a universal joint 148a; see Fig. 3.

Air and cotton enter the main part of the blower casing through a vestibule 122, the main part of the casing comprising a cylindrical wall 119 circumferentially about and radially spaced from a bladed rotor 121. This rotor is fixed for rotation with a shaft 125 rotatable within a bearing 126 carried within the front wall of the blower casing. As seen in Fig. 7, the rotor comprises six impeller blades 128 extending radially from the shaft 125.

In the operation of the blower, the rotating rotor discharges air centrifugally against the cylindrical wall 119, the rotation of the fan being counter-clockwise as viewed from the rear in Fig. 7 so that this discharged air is impelled tangentially upwardly from the casing through the vertical outlet 117. The air thus discharged from the space between the fan blades 128 is replaced by air forced by the atmosphere inwardly through the cotton picker unit casing 27, where the spindles project into passage 29. The casing 27 therefore serves as an air chamber, and the cotton picked by the spindles and carried into this chamber, where it is doffed by the doffing mechanism D is carried upwardly by the air conduit legs 33. The air thus forced into the casing and air chamber 27 of the picking unit, laden with the picked cotton, after passing up into the legs 32 and 33 passes backwardly into the conduit 113 and thence through the conduit 114 into the blower inlet. Inlet 112 is arranged transversely of the axis of the rotor 121 whereby the inertia of the cotton has a tendency to cause this cotton to impinge against a deflector wall 112a and thence to move radially of the rotor and conical guard, through an opening 123 in the rear wall of the main part of the casing, and thence onto the cylindrical wall 119 without engaging or being struck by the fan blades.

In Fig. 2, the roof of the hopper 31 can be seen to comprise a vaulted cover member 151 having an opening 152 extending thereacross from its inner edge to its outer edge. The roof or cover member 151 also comprises a hood 153 projecting over the upper inner edge of the receptacle. The opening 152 is covered by a grille 154 which consists of a series of grate units each having a series of laterally spaced elements 155 extending lengthwise across the opening from its inner side to its outer side. One of these grate elements is formed in the hood 153 and therefore has curved elements 155. It is the purpose of the grille 154 to dissipate the air which is discharged upwardly through the spout 118 together with debris, such as sticks, twigs, stems and the like, drawn into the pneumatic system from the plants within the passage 29 in the picking unit, while at the same time retaining the cotton within the receptacle. To better enable the grille 154 to separate the debris from the seed cotton, it is desirable that this grille shall be made wide so that the cotton can be spread over the grille in a thin sheet and thereby decrease the thickness of this sheet through which the debris must be passed prior to reaching the grille for ejection therethrough. Forming the cotton-laden air stream into a thin layer for introduction onto the under side of the grid 154 is accomplished by the spout 118. This spout, as viewed in Figs. 1, 2, 3 and 4, has substantially a square horizontal section at its bottom end, and as it rises it decreases in thickness laterally of the receptacle side wall along which it extends and increases in width lengthwise of the receptacle side wall until the upper end of the spout has a major axis $a$—$a$ running parallel to the adjacent upper edge of the receptacle and a short minor axis $a'$—$a'$ normal to the adjacent receptacle edge. In Fig. 2 where the upper end of the spout 118 is shown in dotted lines, it can be seen that the cotton discharged from this upper end of the spout will issue in a thin layer against the under side of the grille and thereby improve the opportunity for foreign particles to be separated from the cotton and conducted outwardly between the grille elements 155 by the air stream.

The receptacle 31 is supported upon a standard structure consisting of a pair of fore and aft spaced, generally upright angle members 161 and 162. The base frame for the hopper supporting structure comprises a pair of backwardly extending plates 163 and 164, Figs. 1 and 4, attached to the rear axle housing 11. The frame member 164 has a vertical dimension considerably in excess of the plate or member 163 and is attached to a depending axle housing portion 22 as well as to the horizontal axle housing 11. The back ends of the plate-like members 163 and 164 are connected by a cross-plate 165. The member 165 is welded to the members 163 and 164. There is also a welded connection between the vertical and lower end portions of the standards 161 and 162 and the outer side of the base frame member 164. Brace members 160, of which one is shown in Fig. 4, respectively connect mid-sections of the standard members 161 and 162 with the base member 163 through welded connections therewith. The standard structure, consisting of the uprights 161 and 162 and the frame therefor consisting of the parts 163, 164, and 165, is attachable and detachable as a unit to and from the left rear axle housing of the tractor.

The basket part of the receptacle 31 comprises a rectangular frame 166 extending about its upper edge. From the front and rear ends of this frame 166 there depend front and back walls 167 and 168 of open mesh sheet material, which in the present instance is woven from steel wire. These walls 167 and 168 are curved toward one another at their lower edge and at their opposite upwardly extending edges, as illustrated in Figs. 1, 2, and 4. The outer and inner walls 169 and 171 of the basket part of the receptacle are connected with the cupped edges of the end walls at U-shaped reinforcing connecting bands 172 and 173 of steel, and which bands depend from the rectangular frame member 166 bounding the upper edge or brim of the basket. These outer and inner walls 169 and 171 and the intermediate bottom wall portion 171ª are formed with a sectional contour transversely of the tractor that is somewhat parabolic in form. The piece of smooth solid metal sheeting forms the wall 169 while the bottom wall 171ª and the inner wall 171 are formed of wire mesh similarly to the end walls 167 and 168.

Opposite end plates 174 (of which one is shown in Fig. 4) depend from the frame member 166 at the upper outer portions of the basket, and these end plates are journaled upon opposite ends of a rod 175 carried in the standard uprights 161 and 162. This pivotal connection between the basket and the upper ends of the standard members 161 and 162 normally supports the basket in the position illustrated in Fig. 4, with a bottom portion thereof resting upon the footing braces 160 for said standard members, while permitting the basket to be pivoted counter-clockwise from the Fig. 4 position to a dumping position illustrated in Fig. 5.

Dumping of the receptacle is brought about by a hydraulic ram or motor 177 comprising a cylinder 178 having its lower end pivotally connected to a channel cross-piece 179 anchored to the lower ends of the standard uprights 161 and 162 and a piston rod 181 pivotally connected with the outer wall of the receptacle by means of a pin 182 anchored within a pair of fore and aft reenforcing plates 183, which are secured to the outer wall of the basket. When fluid is introduced into the lower end of the cylinder 178, a piston therein (not shown) will be forced upwardly and thereby will force the piston rod 181 upwardly for pivoting the basket into the dumping position. Normally relaxed helical springs 184 (one being shown in Figs. 4 and 5) connected between the standards 161 and 162 and the basket, become distended when the receptacle approaches a poised position and continue to be distended when the basket reaches the over-center dumping position illustrated in solid lines, whereby these springs cause the receptacle to pivot clockwise from the dumping position toward the filling position when fluid is allowed to escape from the lower end of the motor cylinder 178. These springs continue to act upon the receptacle after it has passed the over-center position when returning to the filling position so as to accelerate the return of the basket and thereby minimize the time required for dumping.

Fluid for operating the dumping motor 177 is obtained from a gear pump 185, Fig. 4, secured onto the back end of the housing 81 and driven by the back end of the shaft 80 extending through the differential housing 82 of the tractor. Oil is pumped by the pump 185 from a reservoir formed in the bottom of the casing 81. This oil as it is discharged from the pump is controlled by a valve 186 having a manually operable control lever 187. When the lever 187 is in the upright position illustrated in Fig. 4, the pump discharge is directed through the valve 186 back to the reservoir or sump in the casing 81. When the control lever 187 is pivoted counter-clockwise, as viewed from the rear, the output of oil from the pump 185 is directed into the lower end of the motor 178 through an outlet coupling 188 and a hose (not shown). After the receptacle has been raised, the lever 187 will be moved clockwise back to its upright position where the valve will permit the pump 185 to by-pass but will prevent exhaust of fluid from the motor so that the receptacle can be retained in the dumping position as long as desired. Return of the receptacle to the filling position is initiated by movement of the lever 187 clockwise, as viewed in Fig. 4, to a position beyond the upright position there illustrated. This allows the motor to drain, and after the receptacle has reached the filling position, the lever 187 will be returned to the neutral position of Fig. 4.

A linkage is provided for causing the cover 151 of the receptacle to pivot about hinges 189 connecting the inner edge of this cover member with the basket brim, when the receptacle is pivoted to the dumping position. When so pivoted, the cover member is opened with respect to the basket so that the cotton is readily dumpable from the basket into a wagon box, or the like, which may be driven up alongside of the machine. The linkage for opening the cover 151 includes double-legged brackets 191 secured to opposite ends of the cover member and links 192 respectively pivotally attached to ears 193 on these brackets 191 and having a sliding connection with respective pins 194 pivotally anchored in arms 195 which are fixed to opposite ends of the non-rotatable rod 175. These links 192 have heads 196 on their outer ends for abutment with the pivotal pins 194, as illustrated in Fig. 5, prior to the receptacle reaching the dumping position. Continued counter-clockwise movement of the receptacle, as viewed in Fig. 5, shortly prior to reaching the dumping position and after the links 192 can move no farther upwardly, will cause the links to pull downwardly on the ears 193 and the brackets 191 for causing the cover member to pivot about the pivot pins of its hinges 189 into the opened position. When the receptacle is returned toward the filling position, the links 192 will slide downwardly into the holes therefor in the pins 194, permitting the cover to close upon the top of the receptacle by the force of gravity.

The cover 151 for the basket part of the receptacle 31 is arched between its inner and outer edges and is constructed of debris-impervious sheets 197 and 198 upon opposite sides of the opening 152 formed between these sheets. An arched grille 154 covers this opening, said grille being composed of a plurality of units each consisting of a transverse member 199 having transversely spaced longitudinal elements 155 extending therefrom. The elements 155 extend from each of their associated transverse members 199 toward the outer wall of the receptacle, the wall disposed uppermost in Fig. 2, the free end of each group of elements 155 extending adjacently to and slightly beneath the transverse element 199 of the unit next adjacent thereto in a direction toward the outer wall of the receptacle. Each of the transverse members 199 is hollow to enable it to receive a rod which extends through upright flanges 201 of the angle pieces 202 extending along the opposite edges of the opening 152. One end of the rods extending through the transverse members 199 has a faceted head 203, and the opposite end of each rod is threaded to receive a nut 204.

One of the grid units has its transverse member 199 disposed at the lower end of a hooded portion of the grille which projects outwardly from the inner edge of the basket, and the spaced grille elements 155 projecting from this particular transverse member are curves as illustrated in Figs. 4 and 5.

Cotton-laden air entering the hooded portion of the grille 154 first strikes the curved elements 155 of the grid element unit over the top of the hood. It is at this point that most of the trash is separated from the cotton along with part of the air from the conveying air stream. This part of the air and trash is carried outwardly from the receptacle between the grille elements 155, while the cotton is deflected across the top of the receptacle along the under surfaces of the grille units. During this traversal by the thin layer of cotton across the upper side of the receptacle, part of the air continues to be dissipated through the grille and to carry pieces of foreign material therewith. Particularly because of the momentum of the cotton and because of the air movement across the top of the receptacle, the cotton is caused to be carried to a position adjacently to the upper edge of the outer receptacle wall. This cotton then drops into the lower part of the receptacle but first fills the receptacle within the bottom and along the outer wall, and as the filling process continues, the surface of repose of the cotton will gradually approach the inner part of the receptacle, which part is the last to be filled, whereby the receptacle becomes completely filled without attention of the operator.

There are several factors which improve the dumping ability of the receptacle. One of these features is the arrangement of the longitudinal grille elements 155 so that their free ends are projected away from the hinged edge of the cover member 151 so that any cotton falling from the receptacle against the under side of the grille during the dumping operation will have no tendency to cling to the grille. In other words, the top or cover member of the receptacle itself dumps any cotton that may be therein due to the receptacle being filled to an extent that the cotton is heaped therein or falls against the under side of the grille when the receptacle is dumped.

Another feature that facilitates dumping is the parabolic transverse section through the inner and outer walls and the bottom wall. Because of this curved contour of these walls of the receptacle, the cotton which first falls away from the upper part of the inner wall as the dumping of the cotton actually commences, tends to pull other cotton with it so that there is a progressive rolling away of the cotton from the inner wall (upper when the receptacle is in the dumping position) toward the bottom of said wall and the bottom of the receptacle.

Another feature which improves the dumping characteristics of the receptacle is the use of a smooth sheet in forming the receptacle outer wall 169. Any cotton resting upon this sheet will more readily slide from the receptacle while the latter is in the dumping position. The receptacle is made as light in weight as possible, however, by employing the mesh-woven wire side walls for the most part.

While the center part of the cover member is formed with an opening covered by the grille 154, the ends 197 and 198 of the cover member at the sides of the opening are made of material such as sheet metal though which the dust and dirt and small stems discharged with the air blast through the grille cannot pass through for return back into the receptacle subsequent to discharge through the grille. During operation of the machine, these particles of debris can be seen to gravitate toward the edges of the dome-shaped cover member and to fall away in the atmosphere where they are sometimes swept away by wind. In earlier machines where the top of the receptacle was made perfectly flat, there was such an accumulation of foreign particles upon the top about the air-blast discharge opening that before dumping the cotton it was necessary for the operator to employ a broom for sweeping these particles away from the top so they would not be dumped with the cotton into the vehicle for conveying the cotton from the field.

Having thus disclosed a preferred embodiment of the invention, we claim:

1. In a cotton picking apparatus, a receptacle supporting structure, a cotton receptacle having an upper open side, means tiltably mounting the receptacle on said structure to dump through such open side when tilted, an openable cover closing the receptacle open side, an open-bottom hood mounted on said cover and projecting outwardly over an upper edge portion of the receptacle and being communicative therewith, there being an opening in the top of the hood and in the cover and reaching from a top portion of the hood across a substantial portion of the cover, and an arched grille bridging said opening in a direction lengthwise thereof, said grille comprising slender laterally spaced elements extending lengthwise of the arch, the bottom opening in said hood being adapted for the reception of a cotton laden air stream directed upwardly exteriorly of the receptacle against the end of the grille in the top of the hood, means for elevating said edge portion of the receptacle and the hood pursuant to tilting the receptacle, and the curvature in the arch of said grille being such as to cause it to deflect the cotton from said air stream across the receptacle to the other side thereof while the air stream discharges through the grille upwardly and outwardly of the hood and receptacle incident to carrying foreign particles therewith.

2. In a cotton picking apparatus, receptacle supporting structure, a cotton receptacle having an open upper side, means tiltably mounting the receptacle on said structure to dump through such open side when tilted, an openable vaulted debris-impervious cover structure for the open upper side of said receptacle, said cover structure having an opening adjacent to the upper edge of one upright side of the receptacle and reaching toward the opposite upright side, a grille structure within said opening and having an end portion projecting over and beyond said one side of the receptacle for impingement on its under side by a cotton-laden air stream directed upwardly adjacently to the exterior of said one receptacle side, said grille functioning to pass air and debris from said stream upwardly outwardly of the receptacle while precluding such passage of the cotton, the grille having an arched contour generally conforming to the vaulted cover structure to deflect and direct the impinging cotton toward the upper part of the opposite side of the receptacle, and means for elevating said one side of the receptacle together with the upper edge thereof and said projecting end portion of the grille structure pursuant to tilting the receptacle.

3. In a cotton picking apparatus, a receptacle supporting standard, a cotton receptacle tiltably mounted on said standard and having a four sided upright wall of which the sides are arranged in opposed pairs, the receptacle having an open side bounded by the upper edge of the upright wall and being tiltable to dump through such opening, an openable vaulted debris-impervious cover structure for the open side of said receptacle, said cover structure having an opening adjacently to one of the receptacle sides, said opening reaching toward the opposite side and having a width at least equal to one-third the distance between the other two receptacle sides, a grille structure within said opening and having a portion projecting outwardly beyond the upper edge of said one receptacle side in position for impingement on its under side by a cotton-laden air stream directed upwardly alongside the exterior of the one receptacle side, said grille functioning to pass air and debris from said stream upwardly and outwardly of the receptacle while precluding such passage of the cotton, the grille having an arched contour generally conforming to the vaulted cover structure to deflect and direct the impinging cotton toward the upper part of the opposite side of the receptacle, and means for elevating said one receptacle side together with the upper edge thereof and the grille portion projecting outwardly therebeyond pursuant to tilting.

4. In a vehicular cotton picking apparatus, a standard for supporting a cotton receptacle on the vehicle in an elevated position, a cotton receptacle having opposed side walls, means supporting the receptacle on said standard for tilting movement to place one of said walls in an elevated position relatively to the other incident to dumping the cotton over a dumping edge which is normally the upper edge of said other wall, a debris-impervious vaulted cover structure for the receptacle, said cover structure having an opening adjacently to the one wall and reaching toward the other wall, a grille structure covering said opening and arched to project upwardly from a position on the exterior side of the one wall and across said opening generally toward the other wall, an upwardly projecting portion of said grille exteriorly of the one wall being for impingement by a stream of cotton-laden air directed upwardly adjacent the exterior side of the one wall, said grille functioning to exhaust the air stream and debris from the receptacle while deflecting the cotton adjacently under the cover structure toward the upper side of the other wall, means for elevating the one wall of the receptacle and said upwardly projecting portion of the grille structure pursuant to tilting the receptacle, and means tiltably associating the cover structure with the receptacle to facilitate separation of the cover structure from said dumping edge of said other wall to provide clearance for dumping the cotton while the receptacle is tilted.

5. In a cotton picking apparatus, a receptacle supporting structure, a cotton receptacle having a top opening bounded by upper edges of downwardly extending reticulated walls and a pouring wall, such receptacle being tiltably mounted on said structure for discharging its contents over the upper edge of the pouring wall, a vaulted openable cover structure for the top opening of said receptacle, said cover structure having an opening extending crosswise of the receptacle toward the pouring wall from a position adjacent the upper edge of a receptacle wall opposite to said pouring wall, and an arched grille spanning said opening along a line extending between the pouring wall and said opposite wall, said grille comprising slender laterally spaced elements extending lengthwise of the arch, a grille portion adjacently to said opposite wall being for impingement by a cotton-laden air stream directed upwardly against its under side, said arch being constructed with a curvature arrangement for deflecting the cotton across the receptacle to an upper portion of the pouring wall while the air stream and foreign particles are discharged outwardly through the grille, and means for elevating said opposite wall and the grille portion adjacently thereto pursuant to tilting the receptacle, and said pouring wall being formed with an inner surface which is smooth relatively to said reticulated walls to facilitate sliding of the cotton thereon while the receptacle is tilted.

6. In a vehicular cotton picking apparatus, a standard for supporting a cotton receptacle on the vehicle in an elevated position, a cotton receptacle having a pouring wall and additional walls of which one is opposite to said pouring wall and of which at least part of at least one is reticulated, means supporting the receptacle on said standard for tilting movement to place said opposite wall in an elevated position relatively to the pouring wall incident to discharging the cotton over a dumping edge which is normally the upper edge of said pouring wall, a vaulted debris-impervious cover structure for the receptacle, said cover structure having an opening adjacently to said opposite wall and reaching toward the pouring wall, a grille structure covering said opening and arched to project upwardly from said opposite wall and across said opening generally toward the pouring wall, the upwardly projecting portion of said grille being adapted for impingement by an upwardly directed stream of cotton-laden air, said grille serving to exhaust air and debris of said stream from the receptacle while deflecting the cotton adjacently to the cover structure onto an upper portion of the pouring wall, and means tiltably associating the cover structure with the receptacle to facilitate separation of the cover structure from the dumping edge of the pouring wall to provide clearance for discharging the cotton while the receptacle is tilted, and means for elevating said opposite wall and the grille portion projecting upwardly therefrom pursuant to tilting the receptacle, and said pouring wall being formed with an inner surface which is smooth relatively to said reticulated part of said walls to facilitate sliding of the cotton thereon as it is discharged while the receptacle is tilted.

CLARENCE R. HAGEN.
DAVID B. BAKER.

REFERENCES CITED

The following references are of record in the file of this patent:

UNITED STATES PATENTS

| Number | Name | Date |
|---|---|---|
| 759,151 | Benefield | May 3, 1904 |
| 1,146,066 | Haney et al. | July 13, 1915 |
| 1,887,831 | Willett et al. | Nov. 15, 1932 |
| 1,985,373 | Johnston | Dec. 25, 1934 |
| 2,234,599 | Johnston | Mar. 11, 1941 |
| 2,401,152 | Hagen | May 28, 1946 |
| 2,440,770 | Hagen | May 4, 1948 |